US008046991B2

(12) United States Patent
Long

(10) Patent No.: US 8,046,991 B2
(45) Date of Patent: Nov. 1, 2011

(54) SYSTEM FOR SELECTIVELY ROUTING TRANSMISSION FLUID TO A TORQUE CONVERTER

(75) Inventor: Charles F. Long, Pittsboro, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 859 days.

(21) Appl. No.: 12/109,931

(22) Filed: Apr. 25, 2008

(65) Prior Publication Data

US 2009/0266068 A1    Oct. 29, 2009

(51) Int. Cl.
*F16D 31/02* (2006.01)
(52) U.S. Cl. .................. 60/428; 60/329; 60/337
(58) Field of Classification Search .............. 60/329, 60/337, 339, 428, 429, 468
See application file for complete search history.

(56) References Cited

U.S. PATENT DOCUMENTS

| 2,638,746 A * | 5/1953 | Kelley ............................. 60/329 |
| 3,635,026 A * | 1/1972 | Hahn et al. ...................... 60/337 |
| 5,762,134 A * | 6/1998 | Droste et al. .................... 60/329 |

* cited by examiner

*Primary Examiner* — Michael Leslie
(74) *Attorney, Agent, or Firm* — Barnes & Thornburg LLP

(57) ABSTRACT

A torque converter coupled to a transmission has a torque converter operating mode and a lockup operating mode. A first pump may be configured to supply transmission fluid to a plurality of electro-hydraulic transmission components. A second pump may be configured to supply transmission fluid to a lubrication system of the transmission. A valve may be configured to route transmission fluid supplied by the second pump through the torque converter during the torque converter operating mode. Means may also be provided for selectively routing at least some of the transmission fluid supplied by the first pump through the torque converter. Illustratively, transmission fluid supplied by the first pump may, but need not, be routed to the torque converter only during the torque converter operating mode or only during the torque converter operating mode if the temperature of transmission fluid exiting the torque converter exceeds a threshold temperature.

34 Claims, 8 Drawing Sheets

SYSTEM FOR SELECTIVELY ROUTING TRANSMISSION FLUID TO A TORQUE CONVERTER

FIELD OF THE INVENTION

The present invention relates generally to automatic transmissions having a torque converter, and more specifically to systems and methods for selectively routing transmission fluid to the torque converter.

BACKGROUND

It is known to provide two transmission fluid pumps in transmissions having a torque converter. One of the pumps may be configured to supply transmission fluid to the torque converter during torque converter operation. It may be desirable to selectively supplement the supply of transmission fluid to the torque converter with transmission fluid supplied by the other pump.

SUMMARY

The present invention may comprise one or more of the features recited in the attached claims, and/or one or more of the following features and combinations thereof. A system for selectively routing transmission fluid to a torque converter having a torque converter operating mode and a lockup operating mode may comprise a first pump configured to supply transmission fluid from a source of transmission fluid to a plurality of electro-hydraulic components within a transmission, a second pump configured to supply transmission fluid from the source of transmission fluid to a lubrication system of the transmission, a valve configured to route transmission fluid supplied by the second pump through the torque converter to the lubrication system during the torque converter operating mode, and means for selectively routing at least some of the transmission fluid supplied by the first pump through the torque converter.

The system may further comprise a cooler coupled to the lubrication system of the transmission that may be configured to cool transmission fluid passing therethrough. Transmission fluid routed through the torque converter to the lubrication system during the torque converter operating mode may also pass through the cooler.

A system for selectively routing transmission fluid to a torque converter having a torque converter operating mode and a lockup operating mode may comprise a first pump configured to supply transmission fluid from a source of transmission fluid to a plurality of electro-hydraulic components within a transmission, a second pump configured to supply transmission fluid from the source of transmission fluid to a lubrication system of the transmission, a first valve configured to be responsive to a first control pressure supplied thereto during the torque converter operating mode to route transmission fluid supplied by the second pump, and to route at least some of the transmission fluid supplied by the first pump, through the torque converter to the lubrication system.

The system may further comprise a cooler coupled to the lubrication system of the transmission that may be configured to cool transmission fluid passing therethrough. The first valve may be configured to be responsive to the first control pressure supplied during the torque converter operating mode to route transmission fluid supplied by the second pump, and to route at least some of the transmission fluid supplied by the first pump, in a first direction through the torque converter to the cooler and the lubrication system. The first valve may further be configured to be responsive to a second control pressure supplied thereto during the lockup operating mode to route transmission fluid supplied by the second pump to the cooler while bypassing the torque converter, and to route transmission fluid supplied by the first pump in a second direction through the torque converter back to the source of transmission fluid. The second direction may be opposite to the first direction. The first valve may have a spring set position and a pressure set position. The first valve may be in the spring set position when the first control pressure is supplied thereto and may be in the pressure set position when the second control pressure is supplied thereto.

The system may further comprise a second valve fluidly coupled to the first valve, an actuator responsive to a first control signal to control the second valve to supply the first control pressure to the first valve and to a second control signal to control the second valve to supply the second control pressure to the first valve, and a control circuit configured to produce the first and second control signals. The control circuit may include a memory having instructions stored therein that are executable by the control circuit to produce the first control signal to control the torque converter to operate in the torque converter operating mode and to produce the second control signal to control the torque converter to operate in the lockup operating mode. The transmission fluid supplied by the first pump may be routed through the second valve to the first valve when the torque converter is in the lockup operating mode.

The system may further comprise a fluid flow path between the first pump and the torque converter through which transmission fluid supplied by the first pump is routed during the torque converter operating mode, and a flow restrictor positioned within the fluid flow path.

A system for selectively routing transmission fluid to a torque converter having a torque converter operating mode and a lockup operating mode may comprise a first pump configured to supply transmission fluid from a source of transmission fluid to a plurality of electro-hydraulic components within a transmission, a second pump configured to supply transmission fluid from the source of transmission fluid to a lubrication system of the transmission, a first valve configured to be responsive to a first control pressure supplied thereto during the torque converter operating mode to route transmission fluid supplied by the second pump through the torque converter to the lubrication system, and a second valve configured to be responsive to a second control pressure supplied thereto to selectively route at least some of the transmission fluid supplied by the first pump to the first valve for routing by the first valve through the torque converter to the lubrication system during the torque converter operating mode.

The system may further comprise a cooler coupled to the lubrication system of the transmission that may be configured to cool transmission fluid passing therethrough. The first valve may be configured to route transmission fluid supplied by the second pump, and the second valve is configured to route transmission fluid supplied by the first pump, during the torque converter operating mode in a first direction through the torque converter to the cooler and the lubrication system. The first valve may be further configured to be responsive to a third control pressure supplied thereto during the lockup operating mode to route transmission fluid supplied by the second pump to the cooler and the lubrication system while bypassing the torque converter, and to route transmission fluid supplied by the first pump in a second direction through the torque converter back to the source of transmission fluid. The second direction may be opposite to the first direction.

The second valve may further be configured to be responsive to the third control pressure applied thereto during the lockup operating mode to inhibit transmission fluid flow therethrough from the first pump to the torque converter, the cooler and the lubrication system. The system may further comprise a third valve fluidly coupled to the first and second valves, an actuator responsive to a first control signal to control the third valve to supply the first control pressure to the first valve and to supply the second control pressure to the second valve during the torque converter operating mode, and to supply the third control pressure to the first and second valves during the lockup operating mode, and a control circuit configured to produce the first and second control signals. The transmission fluid supplied by the first pump may be routed through the third valve to the first valve when the torque converter is in the lockup operating mode. The control circuit may include a memory having instructions stored therein that are executable by the control circuit to produce the first control signal to control the torque converter to operate in the torque converter operating mode and to produce the second control signal to control the torque converter to operate in the lockup operating mode.

The first and second valves may each have a spring set position and a pressure set position. The first valve may be in the spring set position when the first control pressure is supplied thereto and may be in the pressure set position when the third control pressure is supplied thereto. The second valve may be in the spring set position when the second control pressure is supplied thereto and may be in the pressure set position when the third control pressure is supplied thereto.

The system may further comprise a fluid flow path between the second valve and the torque converter through which transmission fluid supplied by the first pump is routed during the torque converter operating mode, and a flow restrictor positioned within the fluid flow path.

The system may further comprise a cooler coupled to the lubrication system of the transmission that may be configured to cool transmission fluid passing therethrough. The first valve may be configured to be responsive to the first control pressure to route transmission fluid supplied by the second pump during the torque converter operating mode in a first direction through the torque converter to the cooler and the lubrication system, and to a third control pressure to route transmission fluid supplied by the second pump to the cooler and the lubrication system while bypassing the torque converter, and to route transmission fluid supplied thereto by the first pump through the torque converter in a second direction, during the lockup operating mode, the second direction opposite to the first direction. The second valve may be configured to be responsive to the second control pressure to route at least some of the transmission fluid supplied by the first pump through the torque converter to the cooler and the lubrication system via the first valve during the torque converter operating mode and to route at least some of the transmission fluid supplied by the first pump to the cooler and the lubrication system via the first valve while bypassing the toque converter during the lockup operating mode. The second valve may be configured to be responsive to a fourth control pressure to inhibit the transmission fluid supplied by the first pump from flowing to the first valve. The system may further comprise an actuator responsive to a first control signal to supply the second control pressure to the second valve and to a second control signal to supply the fourth control pressure to the second valve, and a control circuit configured to produce the first and second control signals. The control circuit may include a memory having instructions stored therein that are executable by the control circuit to produce the first control signal to control the torque converter to operate in the torque converter operating mode and to produce the second control signal to control the torque converter to operate in the lockup operating mode.

The system may further comprise a third valve. The actuator may be responsive to the first control signal to supply the second control pressure to the third valve and to the second control signal to supply the fourth control pressure to the third valve. The third valve may be responsive to the second control pressure to receive transmission fluid supplied by the first pump and provide the transmission fluid supplied by the first pump with unregulated fluid pressure to the second valve and to the plurality of electro-hydraulic components. The third valve may also be responsive to the fourth control pressure to receive transmission fluid supplied by the first pump and provide the transmission fluid supplied by the first pump with regulated fluid pressure to the second valve and to the plurality of electro-hydraulic components.

The system may further comprise a temperature sensor configured to produce a temperature signal corresponding to a temperature of the transmission fluid exiting the torque converter in the first direction. The control circuit may include a memory having instructions stored therein that are executable by the control circuit to produce the first control signal if the temperature of the transmission fluid exiting the torque converter in the first direction is greater than a temperature threshold, and to produce the second control signal if the temperature of the transmission fluid exiting the torque converter in the first direction is not greater than the temperature threshold.

The system may further comprise a third valve fluidly coupled to the first valve, a first actuator responsive to a first control signal to control the third valve to supply the first control pressure to the first valve and to a second control signal to control the third valve to supply the third control pressure to the first valve, and a control circuit configured to produce the first and second control signals. The system may further comprise a second actuator responsive to a third control signal to supply the second control pressure to the second valve and to a fourth control signal to supply the fourth control pressure to the second valve. The control circuit may be configured to produce the third and fourth control signals.

The control circuit may include a memory having instructions stored therein that are executable by the control circuit to produce the first control signal to control the torque converter to operate in the torque converter operating mode and to produce the second control signal to control the torque converter to operate in the lockup operating mode. The instructions stored in the memory may further include instructions that are executable by the control circuit to produce the third control signal when producing the first control signal and to produce the fourth control signal when producing the second control signal.

The system may further comprise a fourth valve. The second actuator may be responsive to the third control signal to supply the second control pressure to the second valve and to the fourth valve, and to the fourth control signal to supply the fourth control pressure to the second valve and to the fourth valve. The fourth valve may be responsive to the second control pressure to receive transmission fluid supplied by the first pump and provide the transmission fluid supplied by the first pump with unregulated fluid pressure to the second valve and to the plurality of electro-hydraulic components. The fourth valve may also responsive to the fourth control pressure to receive transmission fluid supplied by the first pump and provide the transmission fluid supplied by the first pump with regulated fluid pressure to the second valve and to the plurality of electro-hydraulic components.

The system may further comprise a temperature sensor configured to produce a temperature signal corresponding to a temperature of the transmission fluid exiting the torque converter in the first direction. The control circuit may include a memory having instructions stored therein that are executable by the control circuit to produce the third control signal if the temperature of the transmission fluid exiting the torque converter in the first direction is greater than a temperature threshold, and to produce the fourth control signal if the temperature of the transmission fluid exiting the torque converter in the first direction is not greater than the temperature threshold.

The system may further comprise a temperature sensor configured to produce a temperature signal corresponding to a temperature of the transmission fluid exiting the torque converter in the first direction. The control circuit may include a memory having instructions stored therein that are executable by the control circuit to produce the third control signal when producing the first signal if the temperature of the transmission fluid exiting the torque converter in the first direction is greater than a temperature threshold, and to produce the fourth control signal when producing the first signal if the temperature of the transmission fluid exiting the torque converter in the first direction is not greater than the temperature threshold.

The first and second valves may each have a spring set position and a pressure set position. The first valve may be in the spring set position when the first control pressure is supplied thereto and may be in the pressure set position when the third control pressure is supplied thereto. The second valve may be in the pressure set position when the second control pressure is supplied thereto and may be in the spring set position when the third control pressure is supplied thereto.

A method for selectively routing transmission fluid to a torque converter may comprise supplying transmission fluid with a first pump from a source of transmission fluid to a plurality of electro-hydraulic components within a transmission coupled to the torque converter, supplying transmission fluid with a second pump from the source of transmission fluid through the torque converter when operating the torque converter in a torque converter operating mode, and supplementing the transmission fluid supplied by the second pump to the torque converter when operating in the torque converter mode by also routing at least some of the transmission fluid supplied by the first pump through the torque converter.

The method may further comprise routing transmission fluid exiting the torque converter through a cooler to a lubrication system of the transmission when operating the torque converter in the torque converter mode.

Supplementing the transmission fluid supplied by the second pump to the torque converter when operating in the torque converter mode may comprise determining a temperature of the transmission fluid exiting the torque converter, and routing transmission fluid supplied by the first pump through the torque converter only if the temperature of the transmission fluid exceeds a threshold temperature.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
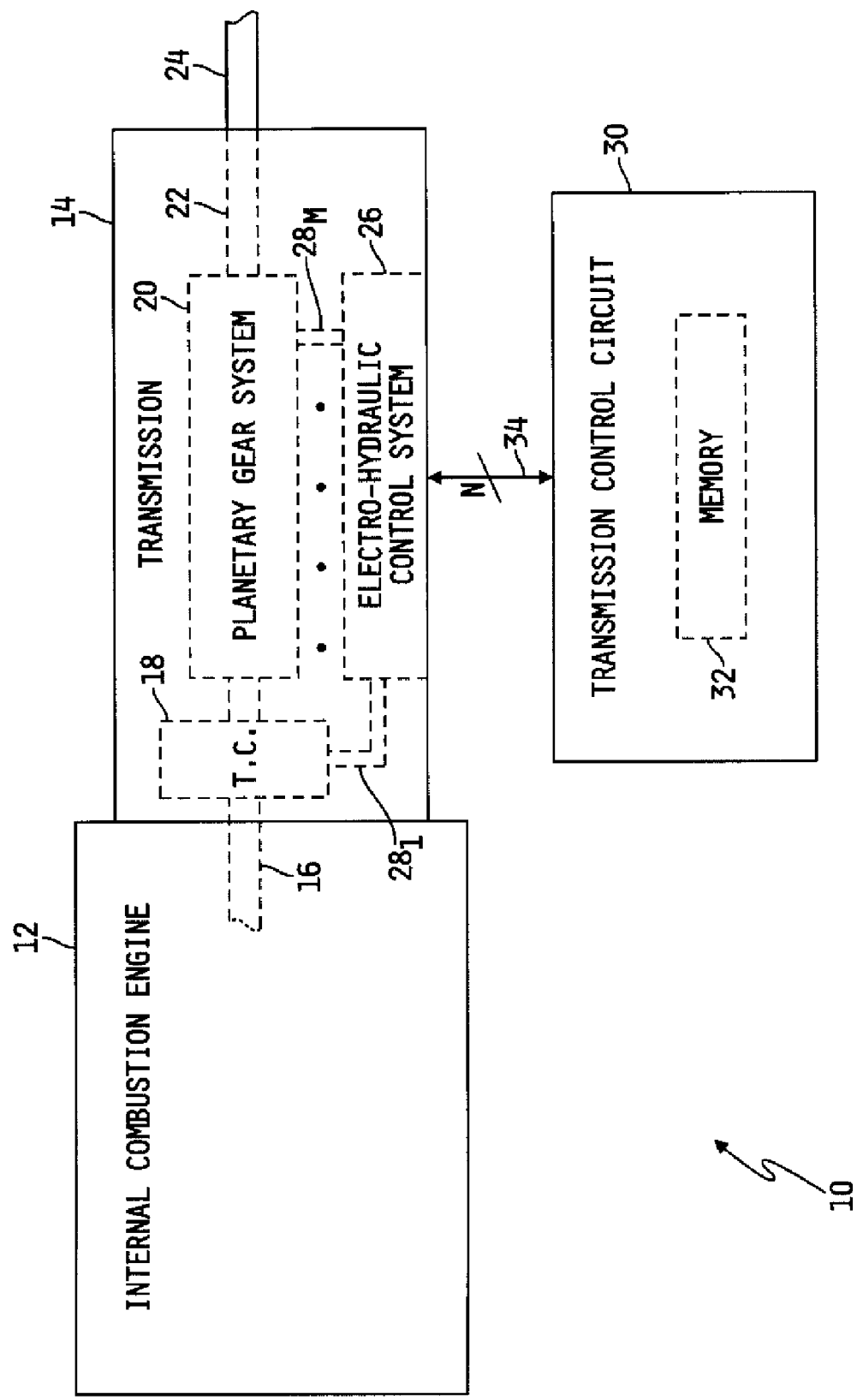
FIG. 1 is a diagram of a system for selectively routing transmission fluid to a torque converter.

Referring now to FIG. 1, a diagram is shown of one illustrative embodiment of a system 10 for selectively routing transmission fluid to a torque converter. In the illustrated embodiment, the system 10 includes an internal combustion engine 12 operatively coupled to a transmission 14. More specifically, the engine 12 drives a rotating output shaft 16 which is connected to an input of a torque converter 18 carried by, or coupled to, the transmission 14. An output of the torque converter 18 is connected to an input shaft of a planetary gear system 20 carried by the transmission 14, and an output shaft 22 of the planetary gear system 20 is coupled to a tail shaft or propeller shaft 24. The tail shaft 24 is operatively coupled to one or more wheels of a vehicle carrying the engine 12 and transmission 24 (not shown) in a conventional manner. The engine 12, torque converter 18, planetary gear system 20, output shaft 22 and tail shaft 24 make up at least a portion of a conventional drive train or power train of a motor vehicle.

The transmission 14 further includes an electro-hydraulic control system 26 that is coupled to the torque converter 18 and to the planetary gear system 20 via a number, M, of connection paths $28_1$-$28_M$, e.g., fluid paths, where M may be any positive integer. The torque converter 18 and planetary gear system 20 may be conventional, and the electro-hydraulic control system 26 includes a number of friction devices, e.g., one or more conventional clutches and/or brakes, that are controlled by a transmission control circuit 30. The transmission control circuit 30 is electrically connected to the electro-hydraulic control system 26 via a number, N, of signal paths 34, where N may be any positive integer. The electro-hydraulic system 26 includes other conventional electrical and hydraulic components, some of which will be described in detail hereinafter. Examples of some of the components of the electro-hydraulic control system 26 include, but are not limited to, fluid pumps, electrically controllable actuators, hydraulically actuated valves, electrical and hydraulic control paths, and the like.

In the embodiment illustrated in FIG. 1, the transmission control circuit 30 is microprocessor-based, and includes a memory unit 32 having instructions stored therein that are executable by the control circuit 30 to control operation of the electro-hydraulic control system via the number, N, of signal paths 34. In alternative embodiments, the transmission control circuit 30 may not be microprocessor-based, but in any case will include hardwired or software instructions that are executable by the control circuit 30 to control the operation of the transmission 14.

Figure 2:
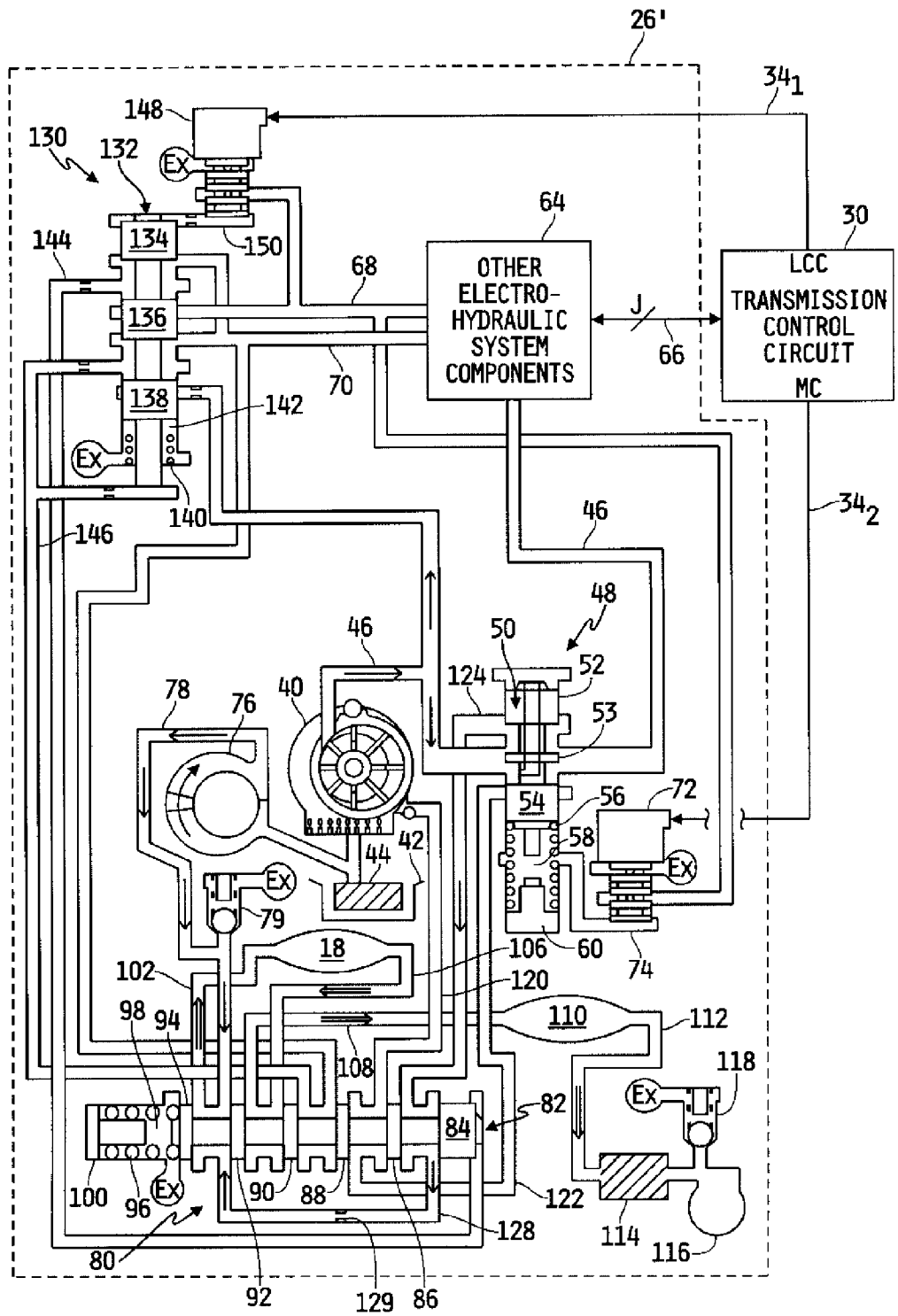
FIG. 2 is a schematic representation of a portion of the electro-hydraulic control system of the transmission of FIG. 1, including one embodiment of a system for selectively routing transmission fluid to the torque converter, shown operating in a torque converter operating mode.
Figure 3:
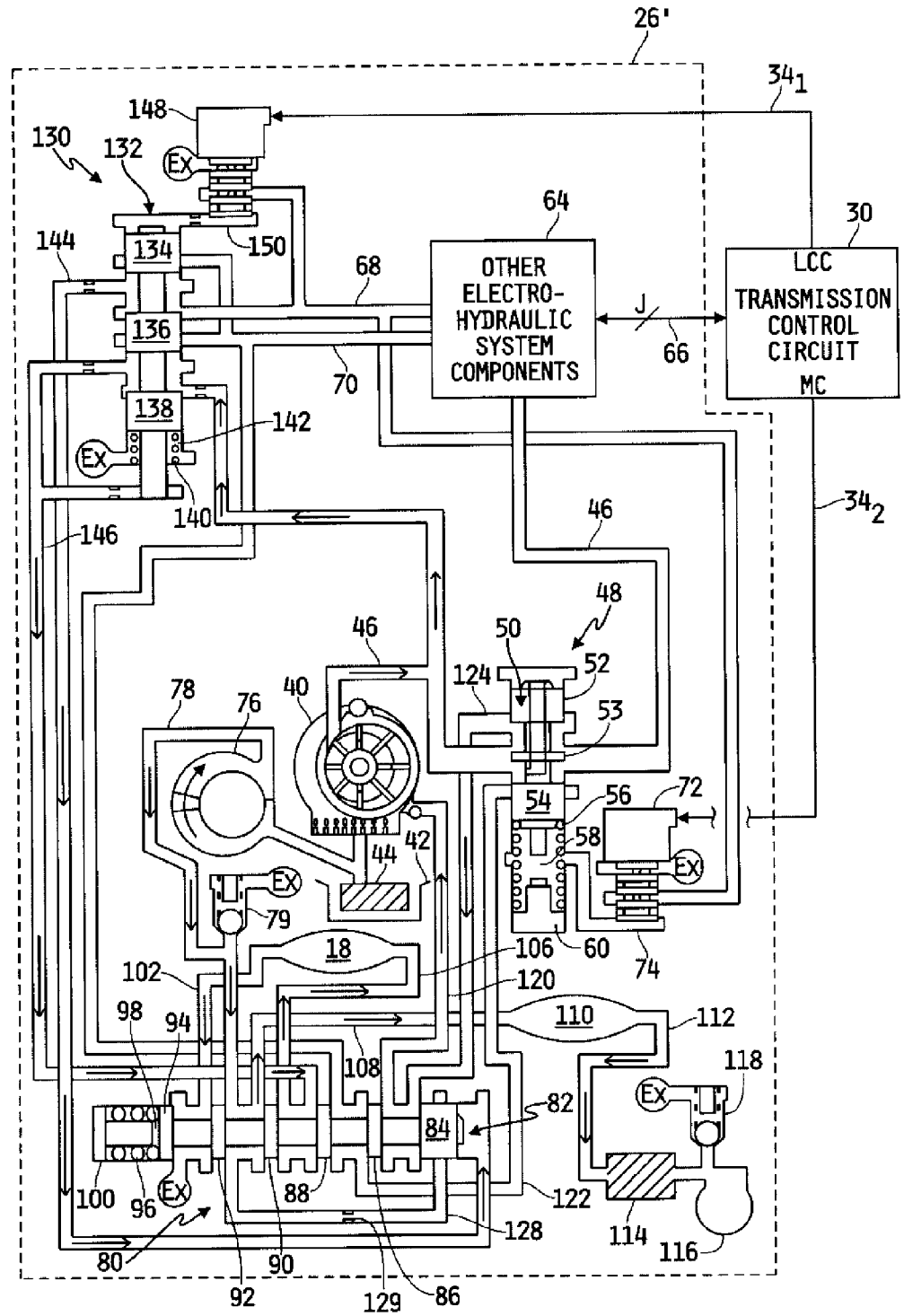
FIG. 3 is a schematic representation of the embodiment of FIG. 2 shown operating in a lockup operating mode.

Referring now to FIGS. 2 and 3, a schematic representation of a portion 26' of one illustrative embodiment of the electro-hydraulic control system of the transmission 14 of FIG. 1 is shown that is configured to selectively route transmission fluid to the torque converter 18. In the illustrated embodiment, the system 26' includes an engine-driven hydraulic pump 40 that draws transmission fluid from a source 42 of transmission fluid, e.g., a reservoir or sump, through a conventional filter element 44. Alternatively, the pump 40 may be an electronically controlled pump that is controlled by the transmission control circuit 30. In any case, an outlet of the pump 40 is connected by a main fluid passage 46 to a conventional main regulator valve 48 that is configured to establish a regulated fluid pressure in the main fluid passage 46. The main regulator valve 48 includes a spool 50 that defines three lands 52, 53, and 54 along its length that are separated from each other by reduced diameter portions. The end of the land 54 is contacted by one end of a spring 56 having an opposite end that contacts a plug 60, wherein the end of the land 54 and the plug 60 define a variable volume chamber 58 therebetween.

The main fluid passage 46 is fluidly coupled to a number of other electro-hydraulic system components, shown generally at 64, which are electrically connected to the transmission control circuit 30 via a number, J, of signal paths 66, wherein J may be any positive integer. For purposes of this disclosure the other electro-hydraulic system components 64 are configured to process the fluid in the main fluid passage 46, under control of the transmission control circuit 30, and produce two reduced fluid pressures, which may be referred to herein as control pressures, within the fluid passages 68 and 70 respectively. The fluid passage 68 is fluidly coupled to one inlet of an actuator 72 that is electrically connected by a signal path 34₂ to a main control output, MC, of the transmission control circuit 30. Illustratively, the actuator 72 is provided in the form of a conventional solenoid valve, although other conventional actuators are contemplated by this disclosure. In any case, the actuator 72 includes a second inlet fluidly coupled to an exhaust port that is fluidly coupled to the source 42 of the transmission fluid, and an outlet that is fluidly coupled via a fluid passage 74 to the chamber 58 of the main regulator valve 48.

Illustratively, the actuator 72 is a variable pressure solenoid valve that is normally "on" or open, so that when the main control signal, MC, produced by the transmission control circuit 30 is low the actuator 72 supplies at least some portion of the fluid pressure within the fluid passage 68 to the chamber 58 of the main control valve 48. Under these conditions, the main control valve 48 operates in a conventional manner to increase the pressure of the transmission fluid supplied by the pump 40 in the main fluid passage 46. When the main control signal, MC, produced by the transmission control circuit 30 is otherwise high, the actuator 72 exhausts the fluid pressure within the chamber 58 of the main regulator valve 48 so that the pressure of the transmission fluid in the main fluid passage 46 supplied by the pump 40 is at a lower pressure. The transmission control circuit 30 is illustratively configured in a conventional manner to control the main control signal, MC, to a low state to thereby increase the pressure of the transmission fluid in the main fluid passage 46, for example, under high engine output torque conditions so as to increase friction applied by one or more friction devices in the other electro-hydraulic system components 64, and to otherwise control the main control signal, MC, to a high state so as to supply transmission fluid through the fluid passage 46 at the pressure defined by the pump 40. However, this disclosure contemplates embodiments in which the transmission control circuit 30 operates to control the main control signal, MC, to low and high states under other operating conditions.

The portion 26' of the electro-hydraulic control system of the transmission 14 that is illustrated in FIG. 2 further includes another engine-driven hydraulic pump 76 that also draws transmission fluid from the source 42 of transmission fluid through the filter element 44. Alternatively, the pump 76 may be an electronically controlled pump that is controlled by the transmission control circuit 30. In any case, an outlet of the pump 76 is fluidly coupled via a fluid passage 78 to a torque converter flow valve 80. A conventional pressure relief valve 79 is fluidly coupled to the fluid passage 78, and the pressure relief valve 79 operates in a conventional manner to exhaust transmission fluid back to the source 42 if the fluid pressure within the passage 78 exceeds a specified pressure. The transmission fluid contained in the reservoir 42 and supplied by the pumps 40 and 76 is illustratively a conventional transmission oil, although this disclosure contemplates embodiments in which the transmission fluid may be or include other fluid components.

In the illustrated embodiment, the torque converter flow valve 80 includes a spool 82 defining a number of lands 84, 86, 88, 90, 92 and 94 along its length that are separated from each other by reduced diameter portions. The end of the land 94 is contacted by one end of a spring 96 having an opposite end that contacts a plug 100, wherein the end of the land 94 and the plug 100 define a spring chamber 98 therebetween that contains the spring 96. The end of the land 84 at the opposite end of the spool 82 is fluidly coupled to a torque converter control valve 130 via a fluid passage 144.

The torque converter control valve 130 includes a spool 132 defining three lands 134, 136 and 138 along its length that are separated from each other by reduced diameter portions. The end of the land 138 is contacted by one end of a spring 140 having an opposite end that contacts a plug, wherein the end of the land 138 and the plug define a spring chamber 142 therebetween that contains the spring 140. The end of the land 134 at the opposite end of the spool 132 is fluidly coupled to an outlet 150 of an actuator 148 that is electrically connected by a signal path 34₁ to a lockup control command output, LCC, of the transmission control circuit 30. Illustratively, the actuator 148 is provided in the form of a conventional solenoid valve, although other conventional actuators are contemplated by this disclosure. In any case, the actuator 148 includes a first inlet that is fluidly coupled to the fluid passage 68 which carries a control pressure as described above, and a second inlet fluidly coupled to exhaust.

Illustratively, the actuator 148 is a variable pressure solenoid valve that is normally "off" or closed, so that when the lockup control command signal, LCC, produced by the transmission control circuit 30 is low, corresponding to the torque converter operating mode of the torque converter 18, the actuator 148 exhausts the fluid pressure within the fluid passage 68. Under these conditions, the spring 140 of the torque converter control valve 130 biases the spool 132 to its full upward position as shown in FIG. 2, and in this position the torque converter control valve 130 is in a spring set position. Conversely, when the lockup control command signal, LCC, is high, corresponding to the lockup operating mode of the torque converter 18, the actuator 148 applies the fluid pressure within the fluid passage 68 to the free end of the land 134 of the torque converter control valve 130. Under these conditions, the control pressure within the fluid passage 68 is sufficient to overcome the upward bias of the spring 140, and the spool 134 thus moves downwardly as shown in FIG. 3, and in this position the torque converter control valve 130 is regulating at full pressure. The transmission control circuit 30 is thus operable to control the torque converter control valve 130 between its spring set, i.e. zero pressure, and full pressure positions by correspondingly controlling the lockup control command signal, LCC. In the illustrated embodiment, the torque converter control valve 130 is in the spring set or zero pressure position when the torque converter 18 is operating in the torque converter operating mode, and is in the full pressure position when the torque converter 18 is in the lockup operating mode.

The torque converter flow valve 80 has a spring set position and a pressure set position, and the position of the valve 80 is controlled by the torque converter control valve 130. For example, when the torque converter control valve is in the spring set position as illustrated in FIG. 2, the fluid passage 68 is blocked by the land 136, the fluid passage 46 is blocked by the land 138, and the fluid passage 70 is coupled by the valve 130 to fluid passages 144 and 146. The fluid passage 146 is routed through the torque converter flow valve 80 back to the fluid passage 70, and the fluid passage 144 is fluidly coupled to the free end of the land 84 of the torque converter flow valve 80. In the illustrated embodiment, the control pressure within the fluid passage 70 acting upon the free end of the land 84 is not sufficient to overcome the bias of the spring 96, and the torque converter flow valve 80 is therefore in a spring set position as shown in FIG. 2. The torque converter flow valve 80 is thus in the spring set position when the torque converter 18 is operating in the torque converter operating mode.

With the torque converter flow valve 80 in the spring set position as illustrated in FIG. 2, the fluid passage 78 extending from the pump 76 is fluidly coupled by the torque converter flow valve 80 to a fluid passage 102 that feeds an inlet of the torque converter 18. An outlet of the torque converter 18 is connected to a fluid passage 106 that is routed through the torque converter flow valve 80 to a fluid passage 108 which is connected to an inlet of a conventional transmission fluid cooler 110. An outlet of the cooler 110 is connected via a fluid passage 112 and through a conventional filter element 114 to a lubrication system 116 of the transmission 14. A conventional pressure relief valve 118 is fluidly coupled to the lubrication system 116, and the pressure relief valve 118 operates in a conventional manner to exhaust transmission fluid back to the source 42 if the fluid pressure within the lubrication system 116 exceeds a specified pressure.

In the spring set position, the torque converter flow valve 80 routes transmission fluid to the pump 40 in a fluid passage 120 from a fluid passage 122 that is blocked by the land 54 of the main regulator valve 48. Transmission fluid supplied by the pump 40 to a fluid passage 124 that is fluidly coupled to the fluid passage 46 is routed by the torque converter flow valve 80 to a fluid passage 128, and the fluid passage 128 is routed by the torque converter flow valve 80 to the fluid passage 102. Transmission fluid supplied by the pump 76 to the torque converter 18 during the torque converter operating mode is thus supplemented by at least some of the transmission fluid supplied by the pump 40, which is routed during the torque converter operating mode by the torque converter flow valve 80 to the torque converter 18. This is illustrated diagrammatically in FIG. 2 by the single directional arrows illustrating the flow of transmission fluid from the pump 76 through the fluid passage 78 and the flow of transmission fluid from the pump 40 through the fluid passages 124 and 128, and then by the double directional arrows illustrating the combined flow of transmission fluid from the pumps 40 and 76 through the fluid passage 102, the torque converter 18, the fluid passages 106 and 108 and 112, the cooler 110 and the fluid passage 112 to the lubrication system 116. Illustratively, the fluid passage 128 includes a conventional flow restrictor 129 to facilitate the directional flow of transmission fluid through the fluid passage 128 to the torque converter 18 when the torque converter 18 is operating in the torque converter mode.

The transmission control circuit 30 changes the state of the lockup control command, LCC, from low to higher pressure to switch the torque converter 18 from operating in the torque converter operating mode to operation in the lockup operating mode. When LCC changes from a low to a higher pressure state, the torque converter control valve 130 is controlled by the actuator 148 to an elevated pressure position as described above and as illustrated in FIG. 3. In this position, the spool 132 moves downwardly such that the fluid passage 70 is blocked by the lands 134 and 136, the fluid passage 68 is routed to the fluid passage 144 and the fluid passage 46 is routed to the fluid passage 146. The transmission fluid flowing from the fluid passage 68 to the fluid passage 144 flows to the free end of the land 84 of the transmission flow valve 80 as illustrated in FIG. 3 by the single directional arrows in the fluid passage 144.

The control pressure in the fluid passage 68, and applied to the free end of the land 84 during the lockup operating mode of the torque converter 18 via the fluid passage 144, is sufficient to overcome the bias of the spring 96, and the spool 82 of the torque converter flow valve 80 thus moves to its pressure set position as illustrated in FIG. 3. In this position, the torque converter flow valve 80 couples the fluid passage 78 to the fluid passage 108 so that the transmission fluid supplied by the pump 76 flows directly to the cooler 110 and then to the lubrication system 116 via the fluid passage 112 as illustrated in FIG. 3 by the single directional arrows in the fluid passages 78, 108 and 112. In the pressure set position, the torque converter flow valve 80 also couples the fluid passage 146 to the fluid passage 106, and couples the fluid passage 102 to exhaust so that transmission fluid supplied by the pump 40 to the main passage fluid passage 46 passes through the torque converter control valve 130 to the fluid passage 146, and then from the fluid passage 146 to the fluid passage 106, through the torque converter 18 and then to exhaust via the fluid passage 102 as illustrated in FIG. 3 by the single directional arrows in the fluid passages 46, 146, 106 and 102. In the torque converter operating mode, transmission fluid thus flows from the pump 76 through the torque converter 18 in one direction, as illustrated in FIG. 2, and in the lockup operating mode transmission fluid flows from the pump 40 through the torque converter 18 in an opposite direction as illustrated in FIG. 3, as is conventional. In the pressure set position, the torque converter flow valve 80 further couples the fluid passage 124 to the fluid passage 120 to route transmission fluid supplied by the fluid passage 124 back to the pump 40 to when operating in the lockup operating mode as illustrated by the single directional arrows in the fluid passages 120 and 124.

Figure 4:
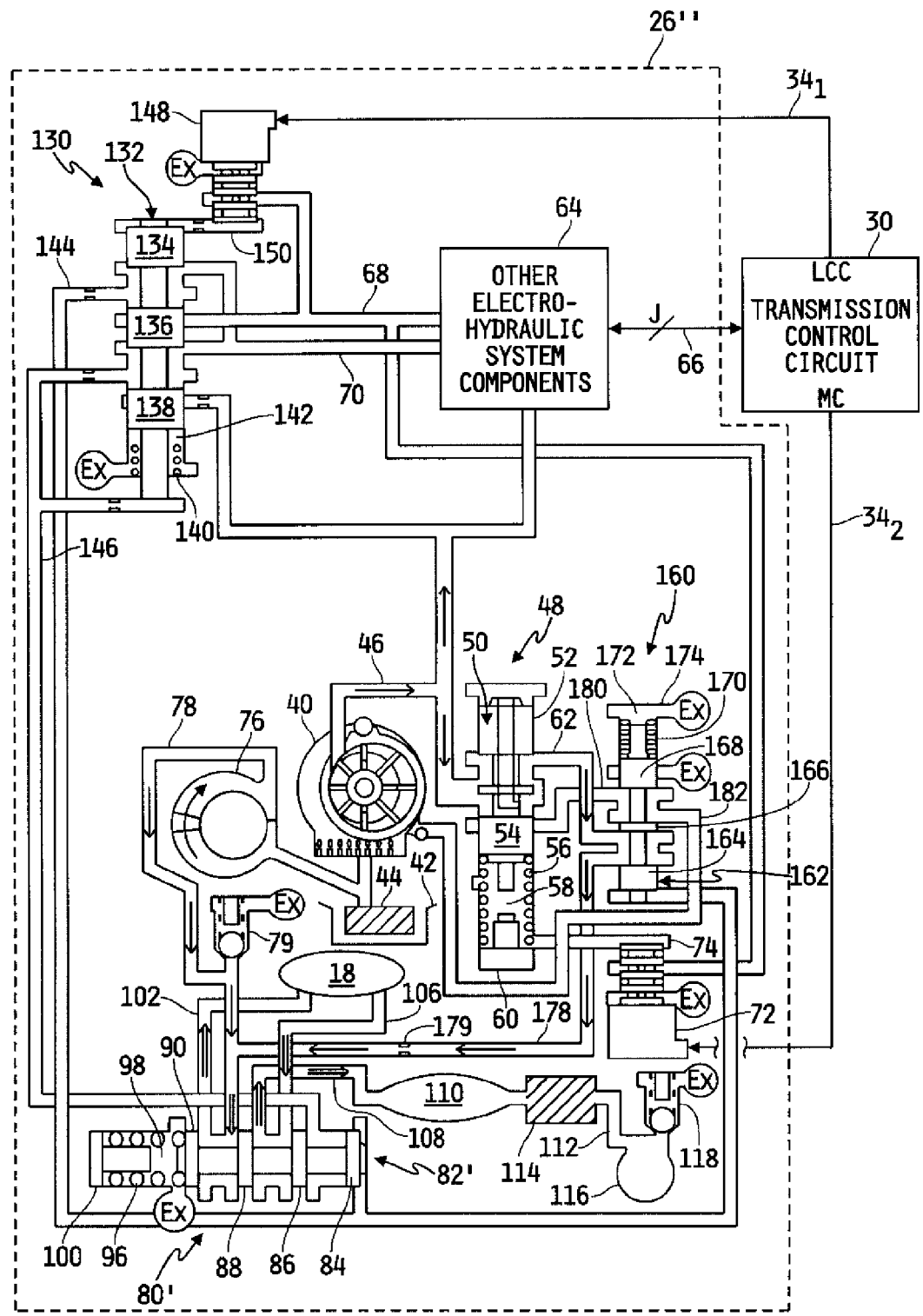
FIG. 4 is a schematic representation of a portion of the electro-hydraulic control system of the transmission of FIG. 1, including another embodiment of a system for selectively routing transmission fluid to the torque converter, shown operating in a torque converter operating mode.
Figure 5:
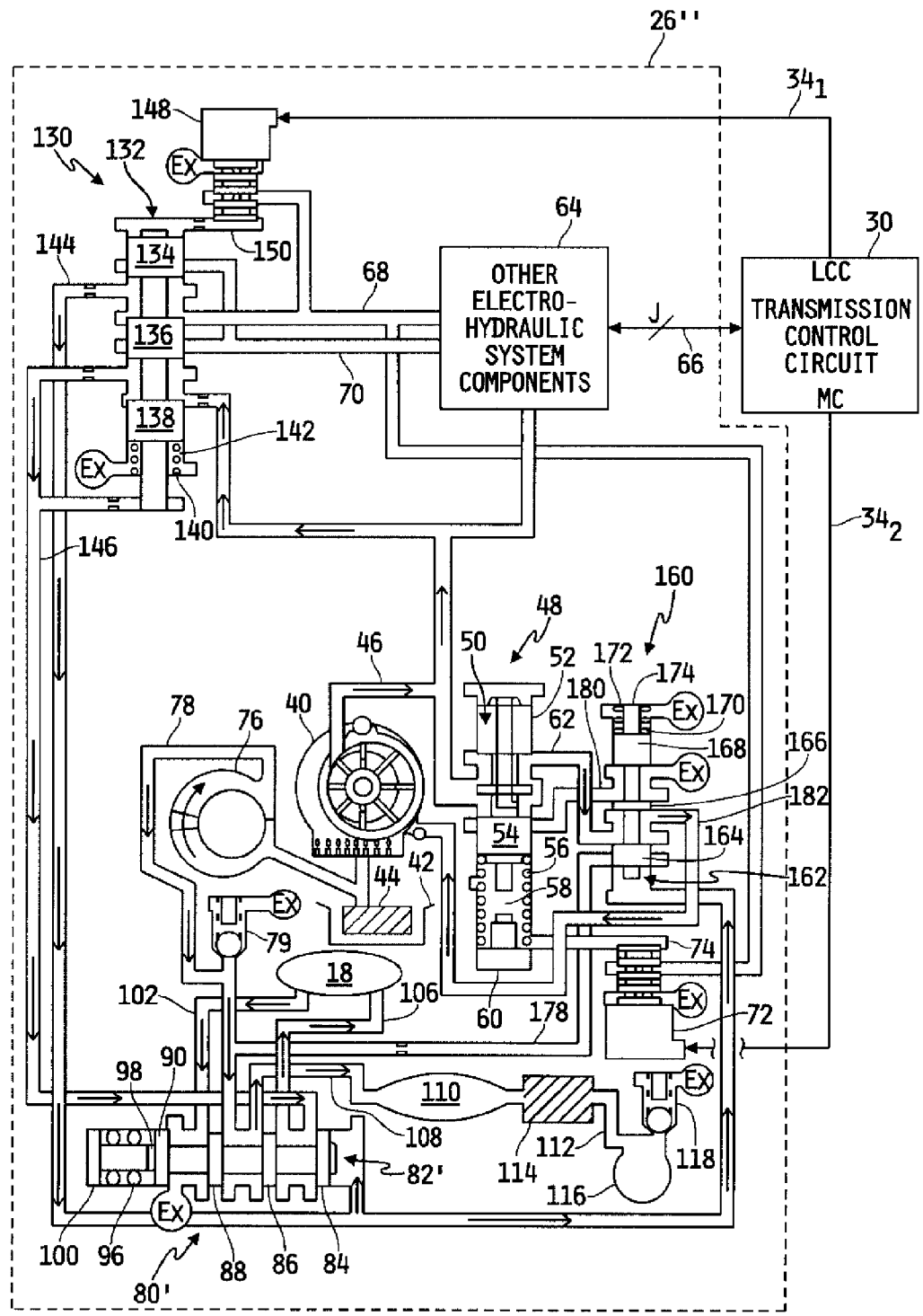
FIG. 5 is a schematic representation of the embodiment of FIG. 4 shown operating in a lockup operating mode.

Referring now to FIGS. 4 and 5, a schematic representation of a portion 26" of another illustrative embodiment of the electro-hydraulic control system of the transmission 14 of FIG. 1 is shown that is configured to selectively route transmission fluid to the torque converter 18. In the illustrated embodiment, the system 26" is identical in many respects to the system 26' illustrated in FIGS. 2 and 3 and described above. Like numbers are used in FIGS. 4 and 5 to identify like components, and a description of the structure and operation of such components will not be repeated here except as may be necessary for an understanding of the embodiment 26". The embodiment 26" generally differs from the embodiment 26' in that the operation of the torque converter flow valve 80 of FIGS. 2 and 3 is partitioned into two separate valves; a torque converter flow valve 80' and a supplemental flow valve 160.

The torque converter flow valve 80' is conventional and includes a spool 82' that defines four lands 84, 86, 88 and 90 along its length that are separated from each other by reduced diameter portions. The end of the land 90 is contacted by one end of a spring 96 having an opposite end that contacts a plug 100, wherein the end of the land 90 and the plug 100 define a spring chamber 98 therebetween that contains the spring 96. The end of the land 84 at the opposite end of the spool 82' is fluidly coupled to the torque converter control valve 130 via the fluid passage 144.

The supplemental flow valve 160 includes a spool 162 that defines three lands 164, 166 and 168 along its length that are separated from each other by reduced diameter portions. The end of the land 168 is contacted by one end of a spring 170 having an opposite end that contacts a plug or end 174, wherein the end of the land 168 and the plug or end 174 define a spring chamber 172 therebetween that contains the spring 170 and that is fluidly coupled to exhaust. The end of the land 164 at the opposite end of the spool 162 is fluidly coupled to the torque converter control valve 130 via the fluid passage 144.

The torque converter flow valve 80' and the supplemental flow valve 160 each have a spring set position and a pressure set position that is controlled by the torque converter control valve 130. The control pressure in the fluid path 144 is insufficient to overcome the biasing force of the springs 96 and 170 when the torque converter control valve 130 is in its spring set position, which occurs when the torque converter is in the torque converter operating mode, as described above. Accordingly, the torque converter flow valve 80' and the supplemental flow valve 160 are both in the spring set position illustrated in FIG. 4 when the torque converter control valve 130 is in the spring set position, which occurs during torque converter operating mode of the torque converter 18. During the lockup operating mode of the torque converter 18, the torque converter control valve 130 is controlled by the transmission control circuit 30 to its pressure regulating position, as described above. When in the pressure regulating position, as illustrated in FIG. 5, the torque converter control valve 130 couples the fluid passage 68 to the fluid passage 144, thereby applying a control pressure to the ends of the lands 84 and 164 that is sufficient to overcome the biasing force of the springs 96 and 170 respectively. Thus, the torque converter flow valve 80' and the supplemental flow valve 160 are both in their pressure set positions illustrated in FIG. 5 when the torque converter control valve 130 is in the pressure regulating position, which occurs during lockup operating mode of the torque converter 18.

With the torque converter flow valve 80' in the spring set position as illustrated in FIG. 4, the fluid passage 78 extending from the pump 76 is fluidly coupled by the torque converter flow valve 80 to a fluid passage 102 as described with respect to FIG. 2. Transmission fluid from the pump 76 is routed by the torque converter flow valve 80', during the torque converter operating mode, through the torque converter 18 to the cooler 110 and lubrication system 116 via the fluid passages 102, 106, 108 and 112 as described above. With the supplemental flow valve 160 also in the spring set position, fluid passages 180 and 182 are blocked by the land 54 of the main regulator valve 48, and a fluid passage 62, which is directly coupled to the main fluid passage 46, is routed by the valve 160 to a fluid passage 178 that intersects the fluid passage 102. Transmission fluid supplied by the pump 40 to the fluid passage 62 is thus routed by the supplemental flow valve 160 to the fluid passage 102 for passage to the torque converter 18 when operating in the torque converter mode. Transmission fluid supplied by the pump 76 to the torque converter 18 during the torque converter operating mode is thus supplemented by at least some of the transmission fluid supplied by the pump 40, which is routed during the torque converter operating mode by the supplemental flow valve 160 and the torque converter flow valve 80' to the torque converter 18. This is illustrated diagrammatically in FIG. 4 by the single directional arrows illustrating the flow of transmission fluid from the pump 76 through the fluid passage 78 and the flow of transmission fluid from the pump 40 through the fluid passages 46, 62 and 178, and then by the double directional arrows illustrating the combined flow of transmission fluid from the pumps 40 and 76 through the fluid passages 78 and 102, the torque converter 18, the fluid passages 106 and 108, the cooler 110 and the fluid passage 112 to the lubrication system 116. Illustratively, the fluid passage 178 includes a conventional flow restrictor 179 to limit the flow of transmission fluid through the fluid passage 178 to the torque converter 18 when the torque converter 18 is operating in the torque converter operating mode.

With the torque converter flow valve 80' in the pressure set position, which occurs during the lockup operating mode of the torque converter 18 as described above, the torque converter flow valve 80' couples the fluid passage 78 to the fluid passage 108 so that the transmission fluid supplied by the pump 76 flows directly to the cooler 110 and then to the lubrication system 116 via the fluid passage 112 as illustrated in FIG. 5 by the single directional arrows in the fluid passages 78 and 108. In the pressure set position, the torque converter flow valve 80' also couples the fluid passage 146 to the fluid passage 106 and couples the fluid passage 102 to exhaust so that transmission fluid supplied by the pump 40 to the main passage fluid passage 46 passes through the torque converter control valve 130 to the fluid passage 144, and then from the fluid passage 144 through the valve 80' to the fluid passage 106, through the torque converter 18 and then to exhaust via the fluid passage 102 as illustrated in FIG. 5 by the single directional arrows in the fluid passages 46, 146, 106 and 102. With the supplemental flow valve 160 also in the pressure set position, the fluid passage 178 is blocked by the land 164, the fluid passage 180 is blocked by the land 54 of the main regulator valve 48, and transmission fluid supplied by the fluid passage 46 to the fluid passage 62 is routed by the valve 160 back to the pump 40 via the fluid passage 182 as illustrated by the single directional arrows in the fluid passages 62 and 182.

Figure 6:
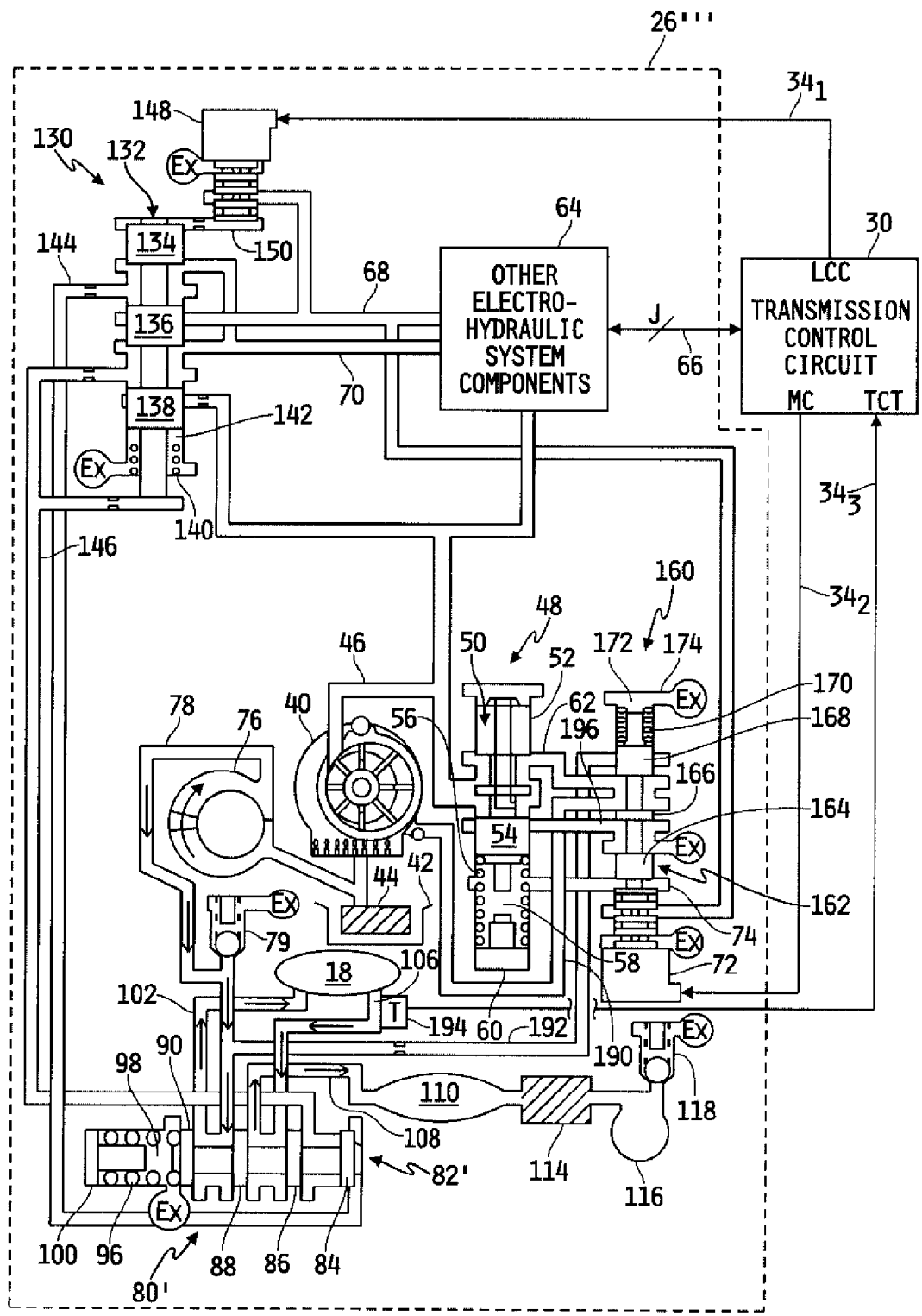
FIG. 6 is a schematic representation of a portion of the electro-hydraulic control system of the transmission of FIG. 1, including yet another embodiment of a system for selectively routing transmission fluid to the torque converter, shown operating in a torque converter operating mode without supplementing the transmission fluid supplied to the torque converter.
Figure 7:
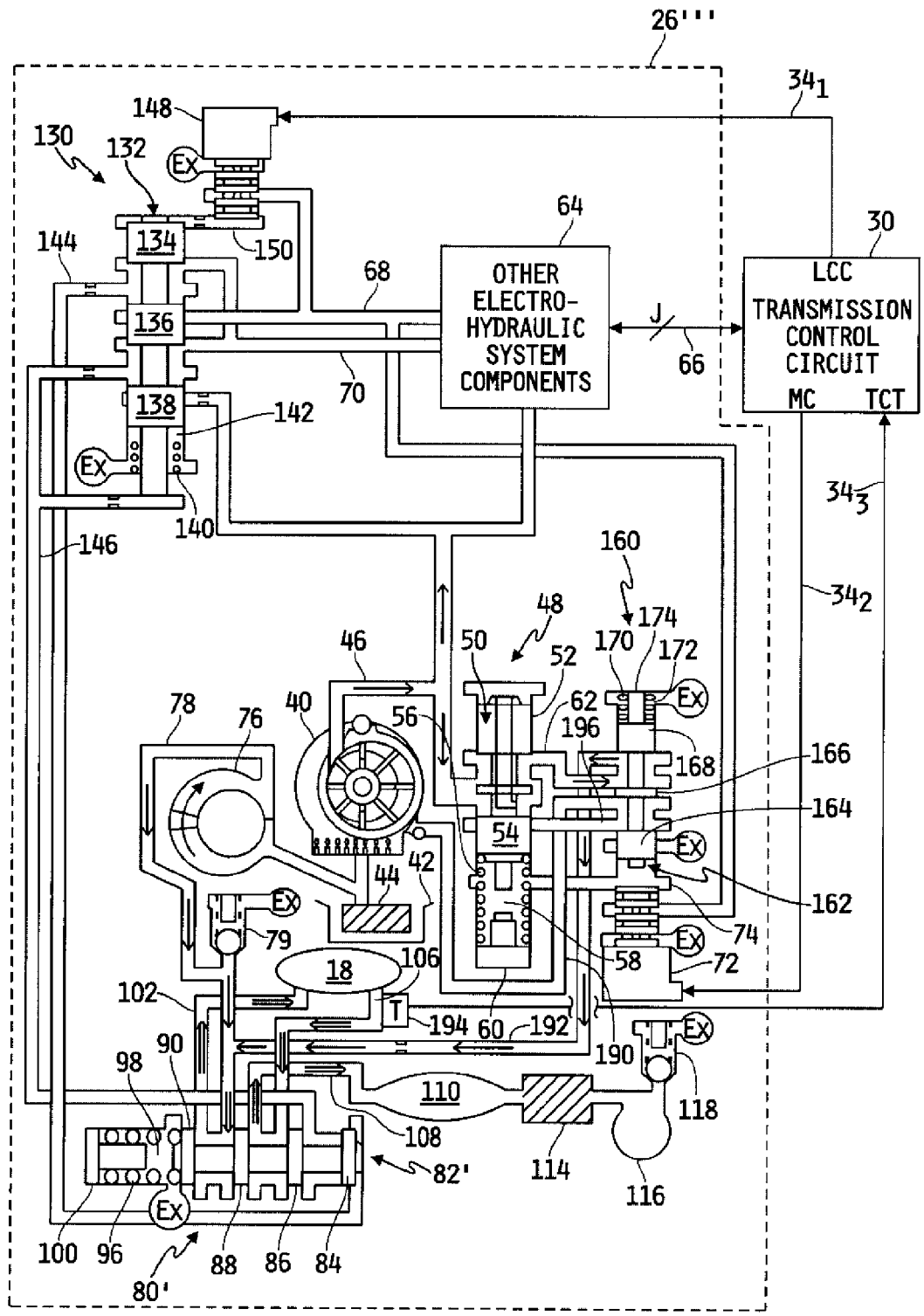
FIG. 7 is a schematic representation of the embodiment of FIG. 6 shown operating in the torque converter operating mode shown with supplemental transmission fluid supplied to the torque converter.

Referring now to FIGS. 6 and 7, a schematic representation of a portion 26'" of another illustrative embodiment of the electro-hydraulic control system of the transmission 14 of FIG. 1 is shown that is configured to selectively route transmission fluid to the torque converter 18. In the illustrated embodiment, the system 26''' is identical in many respects to the system 26'' illustrated in FIGS. 4 and 5 and described above. Like numbers are used in FIGS. 6 and 7 to identify like components, and a description of the structure and operation of such components will not be repeated here except as may be necessary for an understanding of the embodiment 26'''. The embodiment 26''' generally differs from the embodiment 26'' in that the supplemental flow valve 160 is controlled between its spring set and pressure set positions by the actuator 72. More specifically, the fluid passage 74 defined at the outlet of the actuator 72 is, in the embodiment 26''' illustrated in FIGS. 6 and 7, fluidly coupled to the free end of the land 164 of the supplemental flow valve 160 such that the fluid pressure in the fluid passage 74 controls not only the main regulator valve 48 but also the operation of the supplemental flow valve 160.

In the embodiment 26''' illustrated in FIGS. 6 and 7, the torque converter control valve 130 and the torque converter flow valve 80' are each operable as described with respect to FIGS. 4 and 5. In particular, the actuator 148 is responsive to a torque converter operating mode state of the LCC signal, e.g., a low level signal, to exhaust the transmission fluid in the fluid passage 150 such that the torque converter control valve 130 and the torque converter flow valve 80' are each in their spring set positions as described above. In the spring set position, the torque converter flow valve 80' is operable to route transmission fluid supplied by the pump 76 through the torque converter 18 and the cooler 110 to the lubrication system 116 as described above. Conversely, the actuator 148 is responsive to a lockup operating mode state of the LCC signal, e.g., a high level signal, to apply the control pressure in the fluid passage 68 to the fluid passage 150, thereby causing the torque converter control valve 130 to regulate and the torque converter flow valve 80', to be in its pressure set position. In the pressure set position, the torque converter flow valve 80' is operable to route transmission fluid supplied by the pump 76 directly through the cooler 110 to the lubrication system 16 while bypassing the torque converter 18, and the torque converter flow valve 80' and the torque converter control valve 130 are together operable to route transmission fluid supplied by the pump 40 through the torque converter 18, in the opposite direction to that during the torque converter operating mode, to exhaust.

In the embodiment 26''' illustrated in FIGS. 6 and 7, the operation of the supplemental flow valve 160 is controlled by the main control signal, MC, which is illustratively separate and independent from the operation of the valves 80' and 130, which are both controlled by the lockup control command, LCC. In the illustrated embodiment, the supplemental valve 160 may thus be controlled to supply supplemental transmission fluid from the pump 40 to the solenoid flow valve 80' in both the torque converter and lockup operating modes of the torque converter 18. Alternatively, as will be described in greater detail hereinafter, the transmission control circuit 30 may contain logic with which the main control signal, MC, may be produced as a function of one or more other or additional signals and/or operating conditions.

In the embodiment illustrated in FIG. 6, the main control command, MC produced by transmission control circuit 30 is a high level signal, and the actuator 72 is thereby deactivated (the actuator 72 is normally on or open when MC is low). The fluid pressure in the fluid passage 68 is therefore exhausted by the actuator 72, and the fluid pressure in the fluid passage 74 is not sufficient to overcome the bias applied by the spring 170. The supplemental flow valve 160 is therefore in its spring set position which causes a fluid passage 190 to route transmission fluid in the fluid passage 62 back to the pump 40 via the fluid passage 190. Another fluid passage 192 is blocked by the land 168 of the valve 160, and the pressure in another fluid passage 196 is exhausted by the valve 160. Under these conditions, in which the main control signal, MC, produced by the transmission control circuit 30 deactivates the pressure regulating function of the main regulator valve 48, the supplemental flow valve 160 does not supply any transmission fluid from the pump 40 to the torque converter 18 regardless of the operating mode of the torque converter 18.

In contrast, when the main control command, MC produced by transmission control circuit 30 is a low level signal, and the actuator 72 is thereby activated, the fluid pressure in the fluid passage 68 is applied by the actuator 72 to the fluid passage 74. The fluid pressure in the fluid passage 74 under this condition is sufficient to overcome the bias applied by the spring 170, and the supplemental flow valve 160 is therefore in its pressure set position as illustrated in FIG. 7. In the pressure set position, the supplemental flow valve 160 couples the fluid passages 190 and 196 together and the fluid passage 196 is blocked by the land 54 of the main regulator valve. The supplemental flow valve 160 also couples the fluid passage 62 to the fluid passage 192 to route transmission fluid supplied by the pump 40 to the torque converter flow valve 80'. When the torque converter flow valve 80' is in the spring set position, corresponding to the torque converter operating mode of the torque converter 18 as illustrated in FIG. 7, the valves 80' and 160 cooperate to supply transmission fluid from both of the pumps 40 and 76 through the torque converter 18 and the cooler 110 to the lubrication system 116. This condition is illustrated in FIG. 7, as in previous figures, by the single directional arrows in the fluid passages 46, 78, 62 and 192, and by the double directional arrows in the fluid passages 78, 102, 106 and 108.

When the torque converter flow valve 80' is otherwise in its pressure set position, corresponding to the lockup operating mode of the torque converter, the fluid passage 146 is coupled by the valve 80' to the fluid passage 106 (e.g., see FIG. 5) so that transmission fluid supplied by both of the pumps 40 and 76 under these conditions is routed by the torque converter flow valve 80' through the cooler 110 to the lubrication system 116 while bypassing the torque converter 18. Transmission fluid supplied by the pump 40 is routed in the opposite direction through the torque converter 18 under these conditions, however, via the operation of the torque converter control valve 130 and the torque converter flow valve 80' as described above.

As further illustrated in FIGS. 6 and 7, the embodiment 26''' of the electro-hydraulic system of FIG. 1 may further include a temperature sensor 194 that is arranged to sense the temperature of transmission fluid exiting the torque converter 18 and/or entering the cooler 110, and that is electrically connected to a torque converter temperature input, TCT, of the transmission control circuit 30 via a signal path 343. The temperature sensor 194 may be conventional, and may be suitably positioned relative to the outlet of the torque converter 18 or suitably positioned along the fluid passage 106 or 108. In any case, the temperature signal produced by the temperature sensor 194 corresponds to the temperature of the transmission fluid exiting the torque converter 18 and/or entering the cooler 110 during torque converter operation of the torque converter 18.

Figure 8:
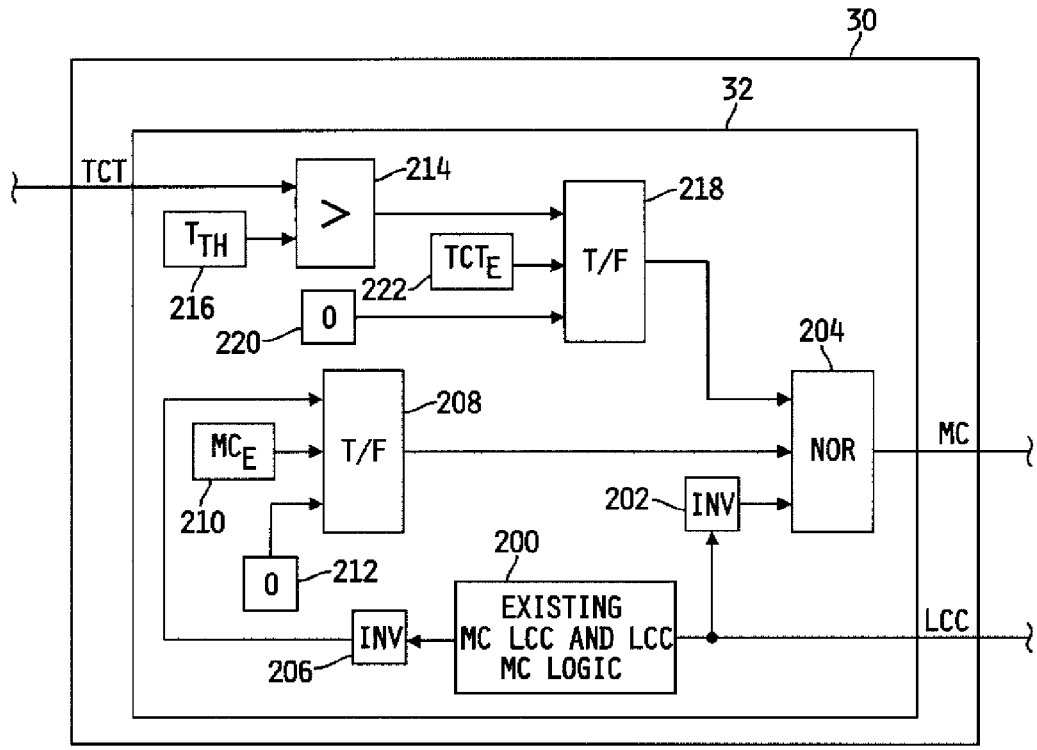
FIG. 8 is a logic diagram illustrating one illustrative algorithm for controlling operation of the supplemental flow valve of FIGS. 6 and 7.

Referring now to FIG. 8, a logic diagram is shown illustrating one illustrative algorithm or set of instructions stored in the memory 32 that is executable by the transmission control circuit 30 to control operation of the supplemental flow valve 160 of FIGS. 6 and 7. In the illustrated embodiment, an existing lockup control command (LCC) and main control (MC) logic block 200 is operable to produce the lockup control command, LCC, and the main control signal, MC. The logic block 200 is stored in the memory 32 in the form of conventional instructions that are executable by the transmission control circuit 30 to produce LCC and MC in a conventional manner. The memory 32 further includes an inverter block 202 that receives the main control signal, MC, and provides an inverted MC control value to one input of a NOR block 204. Another inverter block 206 receives the lockup control command, LCC, produced by the logic block 200 and provides an inverted LCC value to a "true" input of a true/false block 208. A control input of the true/false block 208 receives a main control enable value, $MC_E$, stored in a memory block 210, and the "false" input of the true/false block 208 receives a value of zero stored in a memory block 212. The output of the true/false block 208 is provided to another input of the NOR block 204. The main control enable value, $MC_E$, is a programmable value and may be either "1," in which case the true/false block 208 produces as its output the inverted MC value, or a "0," in which case the true/false block 208 produces a zero output.

In the embodiment illustrated in FIG. 8, the memory 32 further includes a "greater than" arithmetic operator block 214 having one input that receives the torque converter temperature signal, TCT, and another input that receives a temperature threshold value, $T_{TH}$, stored in a memory block 216. The output of the "greater than" block 214 is provided to a "true" input of another true/false block 218 having a "false" input receiving a zero value stored in a memory block 220. A control input of the true/false block 218 receives a torque converter temperature enable value, $TCT_E$ that is stored in a memory block 222. The output of the true/false block 218 is provided to yet another input of the NOR block 204. The torque converter temperature enable value, $TCT_E$, is a programmable value and may be either "1," in which case the true/false block 208 produces as its output the torque converter operating temperature, TCT, if $TCT>T_{TH}$, or zero if $TCT \leq T_{TH}$, or a "0," in which case the true/false block 218 produces a zero output.

In the embodiment illustrated in FIG. 8, the value of the main control signal, MC, produced by the transmission control circuit 30 may be determined by the lockup control command, LCC, alone, by either of LCC or MC if $MC_E$ is active (logic high) and $TCT_E$ is inactive (logic low), by either of LCC or TCT if $TCT_E$ is active (logic high) and $MC_E$ is inactive (logic low), or by any of LCC, MC or TCT if $MC_E$ and $TCT_E$ are both active (logic high). This arrangement provides flexibility in the control of the supplemental flow valve 160 between its spring set and pressure set positions. It will be understood, however, that the operation of the supplemental flow valve 160 in this embodiment will be mirrored in the control of the main regulator valve 48.

Figure 9:
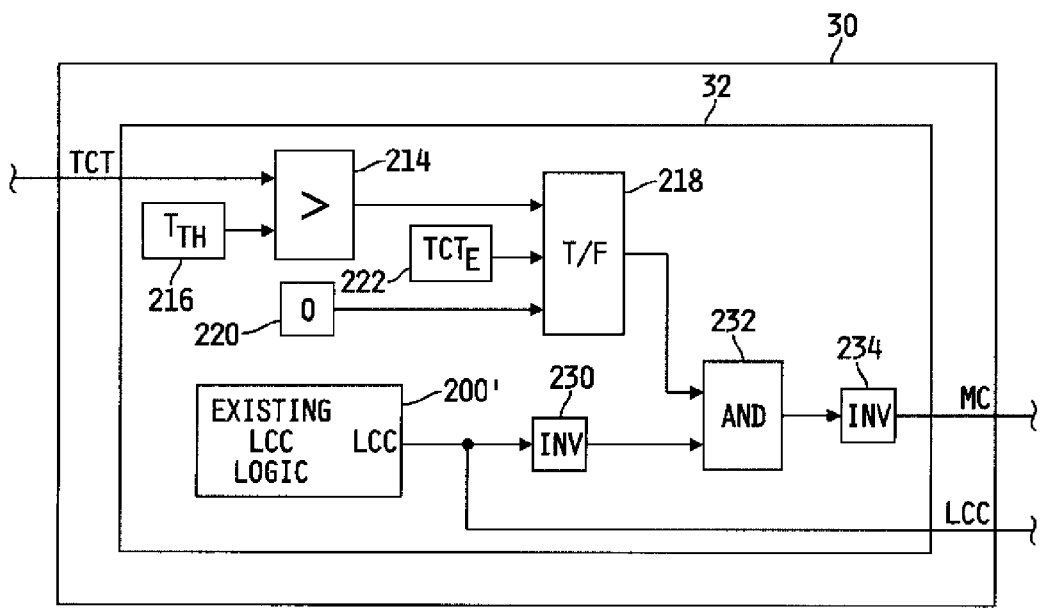
FIG. 9 is a logic diagram illustrating another illustrative algorithm for controlling operation of the supplemental flow valve of FIGS. 6 and 7.

Referring now to FIG. 9, a logic diagram is shown illustrating another illustrative algorithm or set of instructions stored in the memory 32 that is executable by the transmission control circuit 30 to control operation of the supplemental flow valve 160 of FIGS. 6 and 7. In the illustrated embodiment, an existing lockup control command (LCC) logic block 200' is operable to produce the lockup control command, LCC. The logic block 200' is stored in the memory 32 in the form of conventional instructions that are executable by the transmission control circuit 30 to produce LCC in a conventional manner. The logic control command, LCC, is provided to an input of an inverter block 230 having an output connected to one input of an AND block 232. Blocks 214, 216, 218, 220 and 222 are identical to the like numbered blocks of FIG. 8, and the output of the true/false block 218 is connected to another input of the AND block 232. The output of the AND block is provided to one input of an inverter block 234 producing the main control signal, MC, as its output. In the embodiment illustrated in FIG. 9, the main control signal, MC, is low (thereby controlling the supplemental flow valve 160 to its pressure set position) only if the lockup control command, LCC, is low so that the torque converter 18 is operating in the torque converter operating mode, and the temperature of the transmission fluid exiting the torque converter 18 and/or entering the cooler 110 is greater than the temperature threshold, $T_{TH}$. In either of the embodiments illustrated in FIGS. 8 and 9, $T_{TH}$ will typically be selected to be a temperature above which it is desirable to provide supplemental transmission fluid to the torque converter 18 via the pump 40 when the torque converter 18 is operating in the torque converter operating mode.

As described herein, the pump 40 is generally operable in a conventional manner to supply transmission fluid from the source 42 to a number of electro-hydraulic control system components including, for example, but not limited to one or more friction devices, e.g., one or more clutches and/or brakes, comprising the other electro-hydraulic system components 64. The pump 76 is generally operable in a conventional manner to supply transmission fluid from the source 42 to the lubrication system 116, and to also supply transmission fluid from the source 42 to the torque converter 18 when the torque converter 18 is operating in the torque converter operating mode. The electro-hydraulic control system illustrated and described herein is further configured to route transmission fluid supplied by the pump 40 to the torque converter 18 under certain operating conditions, such as when the torque converter 18 is operating in the torque converter operating mode. The transmission fluid supplied by the pump 76 to the torque converter 18 during the torque converter operating mode is thus supplemented under certain operating conditions by transmission fluid supplied by the pump 40. This may relieve some of the burden of transmission fluid supply to the torque converter 18 by the pump 76 in the torque converter operating mode, and in some embodiments this may allow a reduction in the output requirements, and thus the size, of the pump 76.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for selectively routing transmission fluid to a torque converter having a torque converter operating mode and a lockup operating mode, the system comprising:
    a first pump configured to supply transmission fluid from a source of transmission fluid to a plurality of electro-hydraulic components within a transmission,
    a second pump configured to supply transmission fluid from the source of transmission fluid to a lubrication system of the transmission,
    a valve configured to route transmission fluid supplied by the second pump through the torque converter to the lubrication system during the torque converter operating mode, and
    means for selectively routing at least some of the transmission fluid supplied by the first pump through the torque converter.

2. The system of claim 1 further comprising a cooler coupled to the lubrication system of the transmission, the cooler configured to cool transmission fluid passing therethrough, and
wherein transmission fluid routed through the torque converter to the lubrication system during the torque converter operating mode also passes through the cooler.

3. A system for selectively routing transmission fluid to a torque converter having a torque converter operating mode and a lockup operating mode, the system comprising:
a first pump configured to supply transmission fluid from a source of transmission fluid to a plurality of electro-hydraulic components within a transmission,
a second pump configured to supply transmission fluid from the source of transmission fluid to a lubrication system of the transmission, and
a first valve configured to be responsive to a first control pressure supplied thereto during the torque converter operating mode to route transmission fluid supplied by the second pump, and to route at least some of the transmission fluid supplied by the first pump, through the torque converter to the lubrication system.

4. The system of claim 3 further comprising a cooler coupled to the lubrication system of the transmission, the cooler configured to cool transmission fluid passing therethrough,
wherein the first valve is configured to be responsive to the first control pressure supplied during the torque converter operating mode to route transmission fluid supplied by the second pump, and to route at least some of the transmission fluid supplied by the first pump, in a first direction through the torque converter to the cooler and the lubrication system.

5. The system of claim 4 wherein the first valve is further configured to be responsive to a second control pressure supplied thereto during the lockup operating mode to route transmission fluid supplied by the second pump to the cooler while bypassing the torque converter, and to route transmission fluid supplied by the first pump in a second direction through the torque converter back to the source of transmission fluid, the second direction opposite to the first direction.

6. The system of claim 5 wherein the first valve has a spring set position and a pressure set position,
and wherein the first valve is in the spring set position when the first control pressure is supplied thereto and is in the pressure set position when the second control pressure is supplied thereto.

7. The system of claim 3 further comprising:
a second valve fluidly coupled to the first valve,
an actuator responsive to a first control signal to control the second valve to supply the first control pressure to the first valve and to a second control signal to control the second valve to supply the second control pressure to the first valve, and
a control circuit configured to produce the first and second control signals.

8. The system of claim 7 wherein the control circuit includes a memory having instructions stored therein that are executable by the control circuit to produce the first control signal to control the torque converter to operate in the torque converter operating mode and to produce the second control signal to control the torque converter to operate in the lockup operating mode.

9. The system of claim 7 wherein the transmission fluid supplied by the first pump is routed through the second valve to the first valve when the torque converter is in the lockup operating mode.

10. The system of claim 3 further comprising:
a fluid flow path between the first pump and the torque converter through which transmission fluid supplied by the first pump is routed during the torque converter operating mode, and
a flow restrictor positioned within the fluid flow path.

11. A system for selectively routing transmission fluid to a torque converter having a torque converter operating mode and a lockup operating mode, the system comprising:
a first pump configured to supply transmission fluid from a source of transmission fluid to a plurality of electro-hydraulic components within a transmission,
a second pump configured to supply transmission fluid from the source of transmission fluid to a lubrication system of the transmission,
a first valve configured to be responsive to a first control pressure supplied thereto during the torque converter operating mode to route transmission fluid supplied by the second pump through the torque converter to the lubrication system, and
a second valve configured to be responsive to a second control pressure supplied thereto to selectively route at least some of the transmission fluid supplied by the first pump to the first valve for routing by the first valve through the torque converter to the lubrication system during the torque converter operating mode.

12. The system of claim 11 further comprising a cooler coupled to the lubrication system of the transmission, the cooler configured to cool transmission fluid passing therethrough,
wherein the first valve is configured to route transmission fluid supplied by the second pump, and the second valve is configured to route transmission fluid supplied by the first pump, during the torque converter operating mode in a first direction through the torque converter to the cooler and the lubrication system.

13. The system of claim 12 wherein the first valve is further configured to be responsive to a third control pressure supplied thereto during the lockup operating mode to route transmission fluid supplied by the second pump to the cooler and the lubrication system while bypassing the torque converter, and to route transmission fluid supplied by the first pump in a second direction through the torque converter back to the source of transmission fluid, the second direction opposite to the first direction,
and wherein the second valve is further configured to be responsive to the third control pressure applied thereto during the lockup operating mode to inhibit transmission fluid flow therethrough from the first pump to the torque converter, the cooler and the lubrication system.

14. The system of claim 13 further comprising:
a third valve fluidly coupled to the first and second valves,
an actuator responsive to a first control signal to control the third valve to supply the first control pressure to the first valve and to supply the second control pressure to the second valve during the torque converter operating mode, and to supply the third control pressure to the first and second valves during the lockup operating mode, and
a control circuit configured to produce the first and second control signals.

15. The system of claim 14 wherein the transmission fluid supplied by the first pump is routed through the third valve to the first valve when the torque converter is in the lockup operating mode.

16. The system of claim 14 wherein the control circuit includes a memory having instructions stored therein that are executable by the control circuit to produce the first control signal to control the torque converter to operate in the torque converter operating mode and to produce the second control signal to control the torque converter to operate in the lockup operating mode.

17. The system of claim 13 wherein the first and second valves each have a spring set position and a pressure set position,
and wherein the first valve is in the spring set position when the first control pressure is supplied thereto and is in the pressure set position when the third control pressure is supplied thereto,
and wherein the second valve is in the spring set position when the second control pressure is supplied thereto and is in the pressure set position when the third control pressure is supplied thereto.

18. The system of claim 11 further comprising:
a fluid flow path between the second valve and the torque converter through which transmission fluid supplied by the first pump is routed during the torque converter operating mode, and
a flow restrictor positioned within the fluid flow path.

19. The system of claim 11 further comprising a cooler coupled to the lubrication system of the transmission, the cooler configured to cool transmission fluid passing therethrough,
wherein the first valve is configured to be responsive to the first control pressure to route transmission fluid supplied by the second pump during the torque converter operating mode in a first direction through the torque converter to the cooler and the lubrication system, and to a third control pressure to route transmission fluid supplied by the second pump to the cooler and the lubrication system while bypassing the torque converter, and to route transmission fluid supplied thereto by the first pump through the torque converter in a second direction, during the lockup operating mode, the second direction opposite to the first direction,
and wherein the second valve is configured to be responsive to the second control pressure to route at least some of the transmission fluid supplied by the first pump through the torque converter to the cooler and the lubrication system via the first valve during the torque converter operating mode and to route at least some of the transmission fluid supplied by the first pump to the cooler and the lubrication system via the first valve while bypassing the toque converter during the lockup operating mode.

20. The system of claim 19 wherein the second valve is configured to be responsive to a fourth control pressure to inhibit the transmission fluid supplied by the first pump from flowing to the first valve.

21. The system of claim 20 further comprising:
an actuator responsive to a first control signal to supply the second control pressure to the second valve and to a second control signal to supply the fourth control pressure to the second valve, and
a control circuit configured to produce the first and second control signals.

22. The system of claim 21 wherein the control circuit includes a memory having instructions stored therein that are executable by the control circuit to produce the first control signal to control the torque converter to operate in the torque converter operating mode and to produce the second control signal to control the torque converter to operate in the lockup operating mode.

23. The system of claim 21 further comprising a third valve,
wherein the actuator is responsive to the first control signal to supply the second control pressure to the third valve and to the second control signal to supply the fourth control pressure to the third valve,
and wherein the third valve is responsive to the second control pressure to receive transmission fluid supplied by the first pump and provide the transmission fluid supplied by the first pump with unregulated fluid pressure to the second valve and to the plurality of electrohydraulic components,
and wherein the third valve is responsive to the fourth control pressure to receive transmission fluid supplied by the first pump and provide the transmission fluid supplied by the first pump with regulated fluid pressure to the second valve and to the plurality of electro-hydraulic components.

24. The system of claim 21 further comprising a temperature sensor configured to produce a temperature signal corresponding to a temperature of the transmission fluid exiting the torque converter in the first direction,
and wherein the control circuit includes a memory having instructions stored therein that are executable by the control circuit to produce the first control signal if the temperature of the transmission fluid exiting the torque converter in the first direction is greater than a temperature threshold, and to produce the second control signal if the temperature of the transmission fluid exiting the torque converter in the first direction is not greater than the temperature threshold.

25. The system of claim 20 further comprising:
a third valve fluidly coupled to the first valve,
a first actuator responsive to a first control signal to control the third valve to supply the first control pressure to the first valve and to a second control signal to control the third valve to supply the third control pressure to the first valve, and
a control circuit configured to produce the first and second control signals.

26. The system of claim 25 further comprising a second actuator responsive to a third control signal to supply the second control pressure to the second valve and to a fourth control signal to supply the fourth control pressure to the second valve,
wherein the control circuit is configured to produce the third and fourth control signals.

27. The system of claim 26 wherein the control circuit includes a memory having instructions stored therein that are executable by the control circuit to produce the first control signal to control the torque converter to operate in the torque converter operating mode and to produce the second control signal to control the torque converter to operate in the lockup operating mode,
and wherein the instructions stored in the memory include instructions that are executable by the control circuit to produce the third control signal when producing the first control signal and to produce the fourth control signal when producing the second control signal.

28. The system of claim 26 further comprising a fourth valve,
wherein the second actuator is responsive to the third control signal to supply the second control pressure to the second valve and to the fourth valve, and to the fourth control signal to supply the fourth control pressure to the second valve and to the fourth valve, and wherein the fourth valve is responsive to the second control pressure to receive transmission fluid supplied by the first pump and provide the transmission fluid supplied by the first pump with unregulated fluid pressure to the second valve and to the plurality of electro-hydraulic components, and wherein the fourth valve is responsive to the fourth control pressure to receive transmission fluid supplied by the first pump and provide the transmission fluid supplied by the first pump with regulated fluid pressure to the second valve and to the plurality of electro-hydraulic components.

29. The system of claim 26 further comprising a temperature sensor configured to produce a temperature signal corresponding to a temperature of the transmission fluid exiting the torque converter in the first direction, and wherein the control circuit includes a memory having instructions stored therein that are executable by the control circuit to produce the third control signal if the temperature of the transmission fluid exiting the torque converter in the first direction is greater than a temperature threshold, and to produce the fourth control signal if the temperature of the transmission fluid exiting the torque converter in the first direction is not greater than the temperature threshold.

30. The system of claim 26 further comprising a temperature sensor configured to produce a temperature signal corresponding to a temperature of the transmission fluid exiting the torque converter in the first direction, and wherein the control circuit includes a memory having instructions stored therein that are executable by the control circuit to produce the third control signal when producing the first signal if the temperature of the transmission fluid exiting the torque converter in the first direction is greater than a temperature threshold, and to produce the fourth control signal when producing the first signal if the temperature of the transmission fluid exiting the torque converter in the first direction is not greater than the temperature threshold.

31. The system of claim 20 wherein the first and second valves each have a spring set position and a pressure set position, and wherein the first valve is in the spring set position when the first control pressure is supplied thereto and is in the pressure set position when the third control pressure is supplied thereto, and wherein the second valve is in the pressure set position when the second control pressure is supplied thereto and is in the spring set position when the third control pressure is supplied thereto.

32. A method for selectively routing transmission fluid to a torque converter, the method comprising:

supplying transmission fluid with a first pump from a source of transmission fluid to a plurality of electro-hydraulic components within a transmission coupled to the torque converter, supplying transmission fluid with a second pump from the source of transmission fluid through the torque converter when operating the torque converter in a torque converter operating mode, and supplementing the transmission fluid supplied by the second pump to the torque converter when operating in the torque converter mode by also routing at least some of the transmission fluid supplied by the first pump through the torque converter.

33. The method of claim 32 further comprising routing transmission fluid exiting the torque converter through a cooler to a lubrication system of the transmission when operating the torque converter in the torque converter mode.

34. The method of claim 32 wherein supplementing the transmission fluid supplied by the second pump to the torque converter when operating in the torque converter mode comprises:

determining a temperature of the transmission fluid exiting the torque converter, and routing transmission fluid supplied by the first pump through the torque converter only if the temperature of the transmission fluid exceeds a threshold temperature.

* * * * *